United States Patent
Abe

(10) Patent No.: US 7,794,013 B2
(45) Date of Patent: Sep. 14, 2010

(54) CABLE WIRING STRUCTURE OF THE VEHICLE SEAT

(75) Inventor: Tetsuya Abe, Nagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 17 days.

(21) Appl. No.: 12/356,866

(22) Filed: Jan. 21, 2009

(65) Prior Publication Data

US 2009/0189431 A1    Jul. 30, 2009

(30) Foreign Application Priority Data

Jan. 29, 2008   (JP)   ............................. 2008-017665

(51) Int. Cl.
  B60N 2/42   (2006.01)
  B60N 2/48   (2006.01)
  B60R 21/01  (2006.01)
  B60R 21/055 (2006.01)
  A47C 7/14   (2006.01)
  A47C 7/46   (2006.01)

(52) U.S. Cl. ............................. 297/216.12; 297/284.1; 297/284.2; 297/284.4

(58) Field of Classification Search ............ 297/216.12, 297/284.1, 284.2, 284.4
See application file for complete search history.

(56) References Cited

U.S. PATENT DOCUMENTS 7,641,280 B2 *   1/2010   Uno et al. .............. 297/216.12
2006/0006709 A1 *  1/2006   Uno et al. .............. 297/216.12

FOREIGN PATENT DOCUMENTS

JP   2005-212596 A   8/2005
JP   2006-007826 A   1/2006

OTHER PUBLICATIONS

English language Abstract of JP 2006-007826 A.
English language Abstract of JP 2005-212596 A.

* cited by examiner

*Primary Examiner*—Rodney B White
(74) *Attorney, Agent, or Firm*—Greenblum & Bernstein, P.L.C.

(57) ABSTRACT

A cable wiring structure of a vehicle seat is provided including a headrest attached to a seat-back, a skin member covering the seat-back, a cable extending in the seat-back, a wire member extending between sides of a frame, and a strip member attached to the wire member. When the cable is pulled and the headrest is moved to a seat front side, the cable is moved to extend through a guiding recess portion formed in a portion of the wire member and a portion of the skin member is pulled into the seat-back as the portion of the skin member is extended by the strip member over the guiding recess portion.

4 Claims, 5 Drawing Sheets

CABLE WIRING STRUCTURE OF THE VEHICLE SEAT

This application claims priority to Japanese patent application Ser. No. 2008-017665, the contents of which are incorporated herein by reference.

BACKGROUND OF THE INVENTION

1. Field of the Invention

The present invention relates to a cable wiring structure of a vehicle seat. More specifically, it relates to a cable wiring structure for a headrest.

2. Description of the Related Art

A type of a cable wiring structure for a headrest is described in JP-A-2006-7826. The headrest (also know as an "active headrest") can move to a seat front side to protect the head portion of a passenger in a back collision of a vehicle. The vehicle seat includes a system of moving a headrest to a seat front side.

The system of moving a headrest includes a moving system of a seat upper portion and a pressure receiving plate of a seat lower portion. The moving system and the pressure receiving plate are connected by a cable wired in a seat up and down direction inside of the seat-back in an erected state. When the pressure receiving plate is inclined by pressing a passenger to the seat-back under an impact of a back collision, the cable is pulled to a seat lower side and operates the moving system.

Another type of wiring structure is described in JP-A-2005-212596. In this structure, the cable is bent to a seat front side in the midst of wiring the cable (a vicinity of a seat-back upper portion), and a seat-back rear face shape is fastened at a vicinity of a seat upper portion to make a width thereof narrow (refer to [FIG. 2] of the reference).

The seat-back rear face shape of a front seat is preferable for storing a seat-cushion of a rear seat (a rear seat having a double folding system) on a rear side of the front seat The seat-cushion of the rear seat can be contained on or within the seat-back rear face of the front seat.

The seat-back rear face shape can simply be formed by fixing a skin member covering the seat-back rear face in a state of pulling the skin member to the seat-back.

However, in this structure, there is a case in which the cable (particularly, a bent portion thereof) constitutes a hindrance in fixing the skin member into the seat-back in a pulling state.

Incidentally, an interference with the skin member can be avoided by shifting the bent portion of the cable in the seat up and down direction. However, an inclination of the pressure receiving plate is difficult to be transmitted smoothly by changing the bent state of the cable.

SUMMARY OF THE INVENTION

One aspect of the present invention can include a headrest attached to a seat-back a skin member covering the seat-back, a cable extending in the seat-back, a wire member extending between sides of a frame, a strip member attached to the wire member, so that when the cable is pulled and the headrest is moved to a seat front side by being pulling the cable, the cable is moved to extend through a guiding recess portion formed in a portion of the wire member and a portion of the skin member is pulled into the seat-back as the part of the skin member is extended by the strip member over the guiding recess portion.

DETAILED DESCRIPTION OF THE INVENTION

Each of the additional features and teachings disclosed above and below may be utilized separately or in conjunction with other features and teachings to provide the a cable wiring structure of a vehicle seat. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Hereafter, a description will be given, referring FIGS. 1 to 7, of a best mode for carrying out one aspect of the invention. In each figure, a reference letter F will be given to a front side of a vehicle seat, a reference letter B to a back side of a vehicle seat. The seat-back up and down direction is determined by referencing FIG. 1, which shows the seat-back in the up direction or erected state.

First Embodiment

Figure 1:
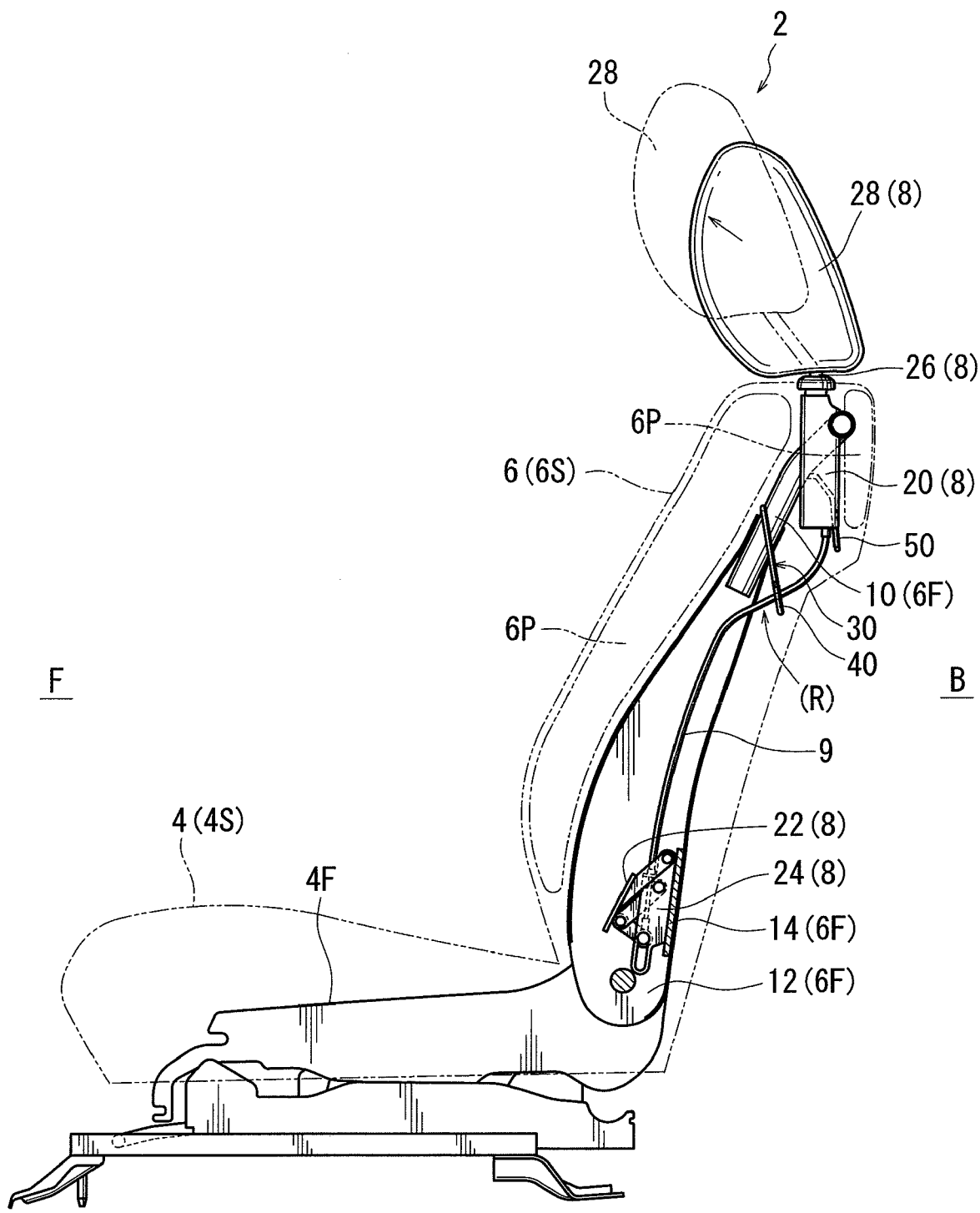
FIG. 1 is a perspective view of a vehicle seat side in an erected state.

A vehicle seat 2 includes a seat-back 6, a seat-cushion 4 and an active headrest 8 (see FIG. 1). The seat-back 6 is rotatably attached to the seat-cushion 4, and can incline and recline in relation to the seat cushion. The active headrest 8 is attached to an upper portion of the seat-back 6. The seat-back 6 includes a system of moving a headrest main body 28 toward a seat front side (upper inclined direction).

The system includes a moving system 20, a pressure receiving plate 22 and a cable 9. The moving system 20 and the pressure receiving plate 22 is connected by the cable 9 wired in the seat up and down direction inside of the seat-back 6. The cable 9 is configured to be bent toward the seat front side at a vicinity of an upper portion of the seat-back 6 (bent portion R).

A rear face shape of the seat-back 6 has a portion configured at a vicinity of a seat upper portion which has a narrow width. The rear side of the seat-back 6 can opposedly contain one portion of a rear seat (not illustrated), for example, a seat-cushion of a rear seat including a double folding system.

The rear face shape is formed by attaching a portion of a skin member 6S onto the seat-back 6 in a pulling state by using a wire member 30. At this occasion, the cable 9 (particularly, the bending portion R) can constitute a hindrance.

According to the embodiment, a desired shape of the seat-back 6 is made to be formed simply while preventing an interference of the wire member 30 or the like with the cable 9 (while maintaining a pertinent cable wiring state).

The cable wiring structure includes the wire member 30 arranged at the back frame 6F and a strip member 60 for attaching the skin member 6S to the wire member 30.

(Back Frame)

Figure 2:
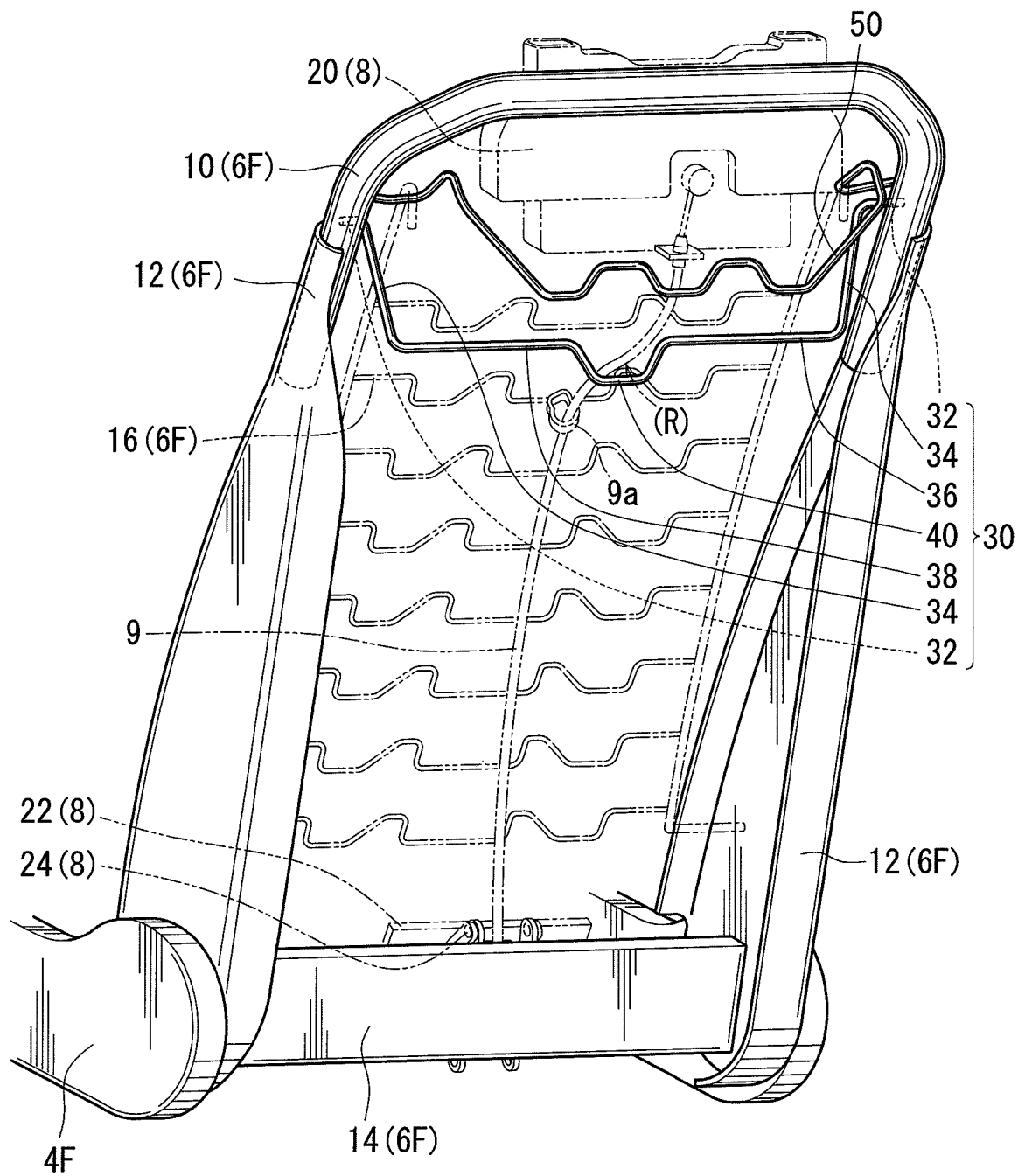
FIG. 2 is a perspective view of a back side of a back frame.

Referring to FIG. 2, the back frame 6F (arch-like shape in a front view) includes a pipe frame 10 constituting an upper skeleton, a pair of side frames 12, 12 constituting a side skeleton, and a plate member 14 constituting a lower skeleton. A front side (seating face side) of the back frame 6F is expanded with a cushion spring 16 (mesh-like shape).

The pipe frame 10 ("an example of a frame constituting both sides of a seat-back") constitutes substantially an inverse U-like shape as a whole. Both side portions thereof are bent to a lower side to be respectively fixed to upper portions of the side frames 12. The pipe frame 10 is arranged with a wire member 30, and a support wire 50 (a zigzag shape in a front view) for supporting a pad member 6P at an upper position of the wire member 30.

(Wire Member)

Referring to FIG. 2, the wire member 30 is constituted by bending a wire-like member substantially in a U-like shape (a front view). Both ends of the wire member 30 constitute a pair of arm portions 34, 34 by being bent to one side. According to the pair of arm portions 34, 34, respective front end portions (engaging portions 32) are bent to an outer side of the wire member 30 to be able to engage with the both side portions of the pipe frame 10.

A center portion of the wire member 30 is bent in a recess shape in a direction reverse to the arm portion 34 (other side directed reverse to one side) to constitute a guiding recess portion 40 for guiding the cable 9. The wire member 30 is divided in two by the guiding recess portion 40 to form a first attaching portion 36 and a second attaching portion 38 for attaching a strip member.

Figure 3:
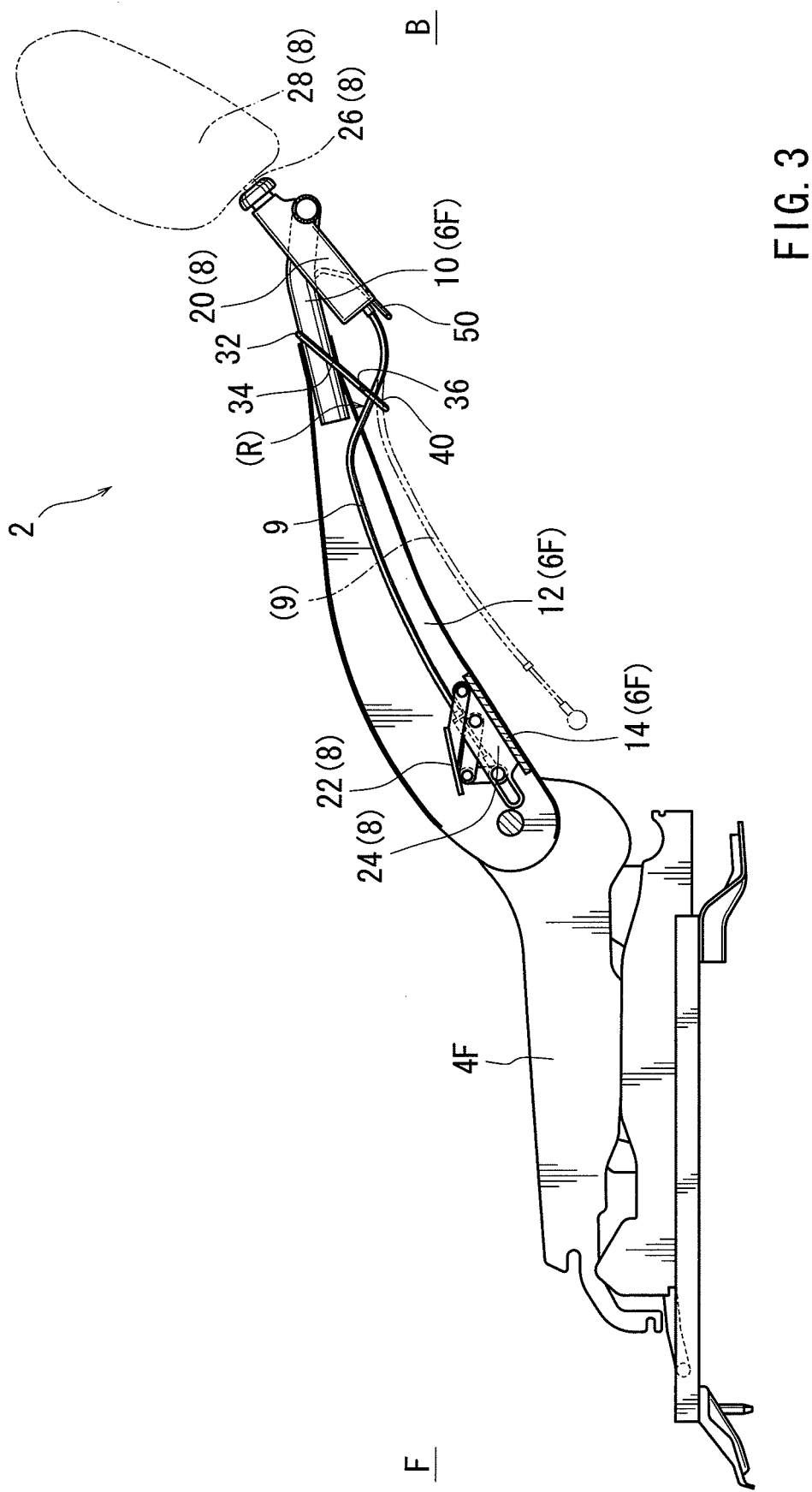
FIG. 3 is a perspective view of a vehicle seat side in an reclined state.

Referring to FIG. 2 and FIG. 3, the wire member 30 is arranged at both side portions of the pipe frame 10 in a bridging shape. The wire member 30 is arranged proximate to a seat upper portion (at a portion of pulling the skin member 6S) of the pipe frame 10. The guiding recess portion 40 is arranged at a seat center of the pipe frame 10.

The engaging portions 32 of the arm portions 34 engage with the side portions of the pipe frame 10 (from a seat front side). Then the wire member 30 is fixed to the pipe frame 10 in a state of being inclined toward a lower side and the guiding recess portion 40 is arranged to project to a seat lower side.

(Operation of Wiring of Cable)

Now, a system of moving the headrest main body 28 to the seat front side (moving system 20, pressure receiving plate 22 and link system 24) is arranged at the back frame 6F (see FIG. 2).

Specifically, the moving system 20 (a rectangular shape in a front view) is arranged at a center rear side of the pipe frame 10 by way of the headrest stay 26. The pressure receiving plate 22 and the link system 24 is arranged at a center front side of the plate member 14. The pressure receiving plate 22 can be inclined toward the seat rear side by being pressed by a passenger. The link system 24 can pull the cable 9 to a seat lower side by being linked with an inclination of the pressure receiving plate 22.

The cable 9 extended from the moving system 20 is connected to the link system 24 by wiring the cable 9 to a center position of the seat-back 6. The cable 9 can be bent during the wiring process. The cable 9 has a length dimension more or less larger than a distance of between the moving system 20 and the link system 24.

When the moving system 20 and the link system 24 are arranged at the back frame 6F during assembly, care should be taken so that cable 9 is prevented from contacting the ground as less as possible.

In this embodiment, after inclining the back frame 6F to a seat rear side relative to the cushion frame 4F, the moving system 20 is fixed toward a rear side position of the pipe frame 10 (see FIG. 3). Further, the cable 9 (extended from the moving system 20) is guided to pass the guiding recess portion 40 (in a shape of being projected to a lower side) of the wire member 30 to be suspended thereby. Then, the pressure receiving plate 22 (link system 24) is fixed to a front side position of the plate member 14 and the cable 9 in a suspended state is connected to the link system 24 of the pressure receiving plate 22.

Thereby, the moving system 20 and the pressure receiving plate 22 and the link system 24 can smoothly be arranged in an excellent order without the cable 9 contacting the ground.

Referring to FIG. 2, the cable 9 is positioned near a rear face side of the cushion spring 16 by a wiring piece 9a and by bending the cable 9 toward the seat front side and by the guiding recess portion 40 (a vicinity of a seat upper portion). Thereby, the moving system 20 (an upper rear side of the seat-back 6) and the link system 24 (a lower front side of the seat-back 6) are connected by the cable 9 having bent portion R.

After arranging a pad member 6P on the back frame 6F, the back frame 6F is covered by the skin member 6S. The pad member 6P is arranged over the cushion spring 16 and covered by the skin member 6S (see FIG. 1 and FIG. 2).

On the other hand, the pad member 6P in the back face stops prior to a middle of the seat-back 6. The pad member 6P in the back face covers the moving system 20 and is supported by the support wire 50 immediately therebelow (see FIG. 4).

In addition, the back face of the pad member 6P is not arranged below the support wire 50 and the wire member 30 faces the skin member 6S. Therefore, a portion of the skin member 6S of the seat-back 6 can be drawn into the seat-back 6 by a strip member 60.

(Strip Member)

Figure 5:
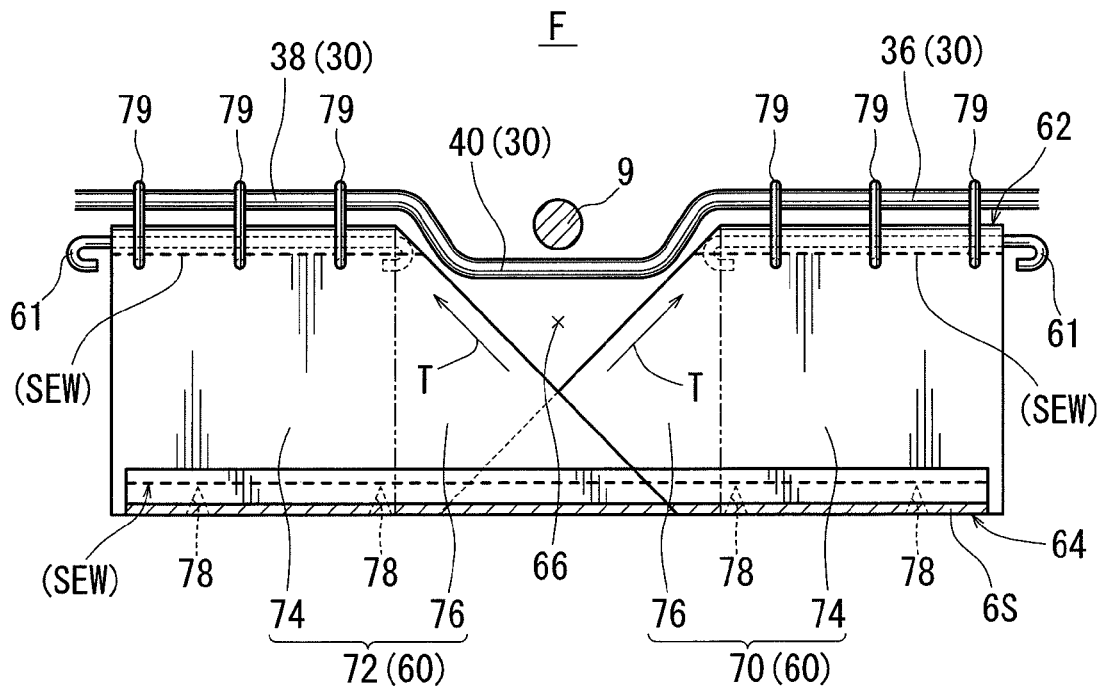
FIG. 5 is perspective view showing an upper front of a vehicle seat of the first embodiment.

Referring to FIG. 5, the strip member 60 (a rectangular shape in an upper front view) is a capable of being expanded in a width direction of the seat-back 6. The strip member 60 includes one edge 64 (first edge) and other edge 62 (second edge). One edge 64 is an attaching portion onto the skin member 6S. Other edge 62 is a fastening portion to the wire member 30 by a hog ring (a ring).

The strip member 60 of this embodiment can be divided in two (a first strip member 70 and a second strip member 72) in correspondence with the wire member 30 (the first attaching portion 36 and the second attaching portion 38). Both of the first strip member 70 and the second strip member 72 (a trapezoidal shape in an upper view) includes a strip-like portion 36 and a pulling portion 76 continuous to one side of the strip-like portion 74. The strip-like portion 74 (a rectangular shape) can be faced the first attaching portion 36 (or second attaching portion 38). The pulling portion 76 (a triangular shape) includes a base by a side of the one edge 64 and an oblique side of being directed to a side of the other edge 62.

Figure 4:
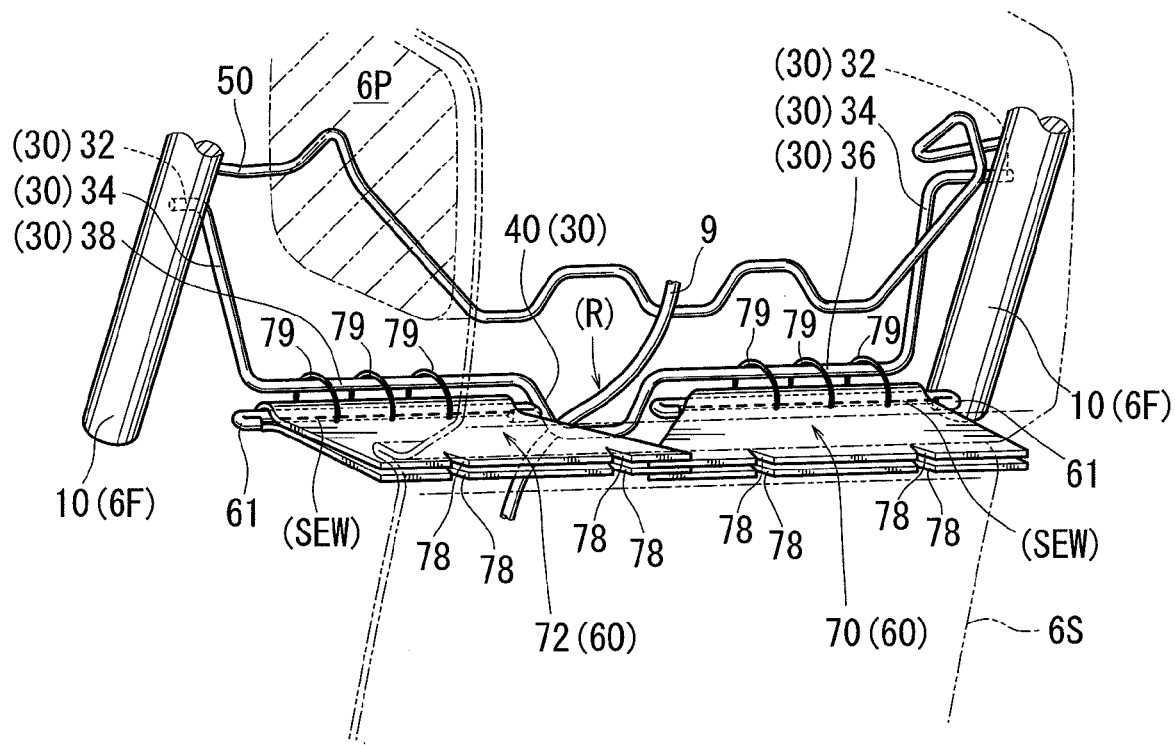
FIG. 4 is a perspective view showing an inner structure of a vehicle seat.

Referring to FIG. 4, the first strip member 70 and the second strip member 72 are constituted by folding one sheet of a cloth member (typically, cotton cloth) to an inner side.

An inner folded edge side of the first strip member 70 (second strip member 72) is inserted with a core member 61 for fastening by the ring member 79 (seam line SEW). Both ends of the core member 61 can have a folded back shape. A procedure of inserting the core member 61 is not particularly limited. For example, after inserting the core member 61 to the inner folding edge side, the core member 61 can be seamed by covered binding. After seaming the inner folding edge side, the core member 61 can be inserted to a gap (cylindrical space portion) formed between the seam line SEW and the inner folding edge.

Free edge sides (two upper and lower sheets of free edges) of the first strip member 70 (second strip member 72) are connected without shift by marks aligned in a width direction (a notch 78 in a triangular shape).

(Operation of Pulling Skin Member)

Now, the first strip member 70 and the second strip member 72 are connected at respective pulling portions 76 (base side) to thereby form the strip member 60 (see FIG. 5). At a center position of the one edge 64, the strip member 70 72 and the pulling portion 76 are connected to each other (in this embodiment, for example, they are connected by stitching). The other edge 62 is formed with the notched portion 66 (space portion substantially in a triangular shape) constituted by the strip members 70, 72 (the pulling portions 76).

A portion of the skin member 6S on the rear face of the seat-back 6 is seamed (seam line SEW) on a side of the one edge 64. The skin member 6S is seamed to the side of the one edge 64 in a pulling state over an entire width in a width direction of the seat-back 6.

Then, the strip member 60 is attached to the wire member 30 by extending around the guiding recess portion 40. Specifically, the strip-like portion 74 (core member 61) of the first strip member 70 is fastened to the first attaching portion 36 by a ring member 79 by pulling a portion of the skin member 6S. Similarly the strip-like portion 74 (core member 61) of the second strip member 72 is fastened to the second attaching portion 38 by the ring member 79.

In this way, after moving the cable 9 passed the guiding recess portion 40, the skin member 6S can be drawn into the seat-back 6 by the strip member 60 attached to the wire member 30 (via guiding recess portion 40).

Therefore, a desired seat-back rear face shape is simply formed, and eliminates interference of the wire member 30 or the like with the cable 9 (while maintaining a pertinent cable wiring state as much as possible).

Meanwhile, according to this structure, the strip member 60 is not directly attached to the guiding recess portion 40. Therefore, there is a concern that the portion of the strip member 60 riding over the guiding recess portion 40 is extended to the seat rear side by a force (tension) of the skin member 6S.

Referring to FIG. 4 and FIG. 5, a center portion of the skin member 6S (skin member facing the guiding recess portion) to the portion of laminating the pulling portions 76, 76 (center position of the one edge 64). Therefore, the center portion of the skin member 6S is pulled more strongly to the wire member 30 (direction indicated by an arrow mark T) by the pulling portions 76, 76 (oblique sides). According to the structure, partial slackening or loosening of the skin member 6S (the surface of the seat-back 6) can be reduced or eliminated.

Second Embodiment

The second embodiment includes similar features as to the first embodiment, therefore a description of a common structures and the like will be omitted by using the same reference numerals or letters.

Figure 6:
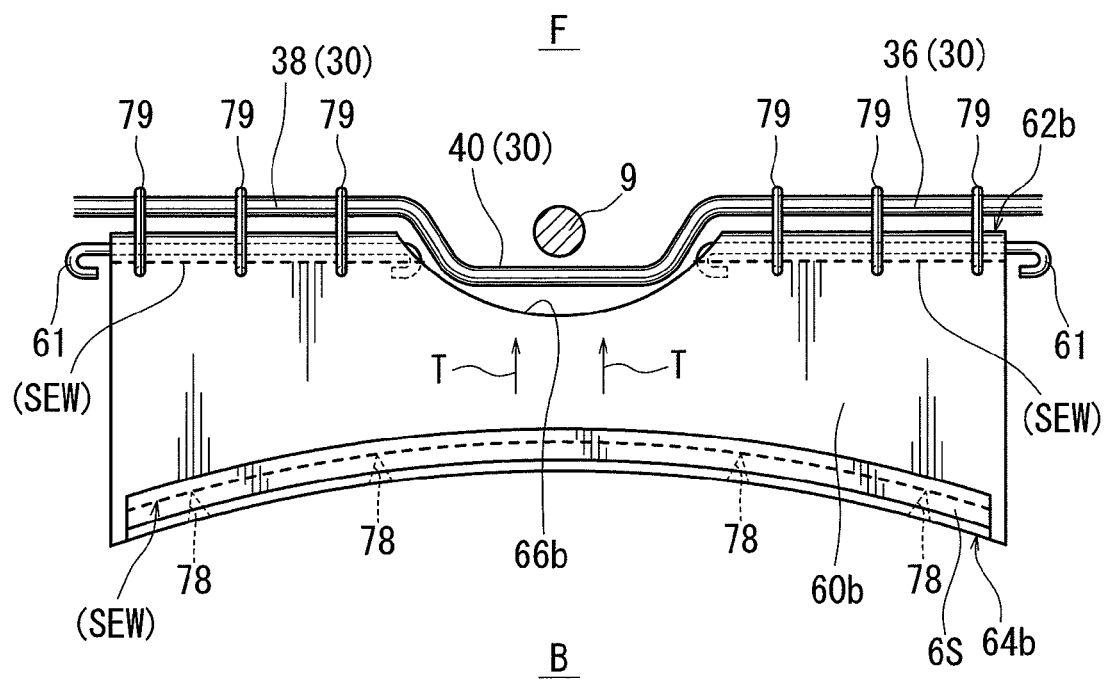
FIG. 6 is perspective view showing an upper front of a vehicle seat of the second embodiment.

Referring to FIG. 6, a strip member 60b (a rectangular shape in an upper front view) is constituted as one continuous strip member that is not divided (typically, two cloth members that are connected).

One edge 64b includes a center portion (pulling portion). The center portion has a bent recess shape (or a concave shape) toward the wire member 30. Other edge 62b is notched in a semicircular shape at a portion thereof (a notched portion 66b is formed in correspondence with the guiding recess portion 40).

Skin member 6S is seamed to the one edge 64b. Then the other edge 62b is arranged such that the notched portion 66b faces the guiding recess portion 40 and is fastened to the wire member 30 by the ring member 79.

A center portion of the skin member 6S seamed to the one edge 64b (pulling portion) is pulled the most strongly toward the wire member 30 (in a direction indicated by the arrow mark T).

According to the structure, partial slackening or loosening of the skin member 6S (the surface of the seat-back 6) can be reduced or eliminated. Further, by constituting the strip member 60b (the continuous strip member), an operation of seaming with the skin member 6S becomes easy.

The constitution can be constructed by constituting either one of the skin member 6S or the one edge 64b can be formed to have a concave or bent configuration (for example, bent recess shape).

For example, when the skin member 6S has a recess shape in the seat width direction (bent recess shape), it can be seamed to the one edge 64b that has a linear shape. According to this structure, the center portion of the skin member 6S is the most strongly pulled to the wire member 30 (in the direction indicated by the arrow mark T).

Third Embodiment

The third embodiment includes similar features as to the first and second embodiment, therefore a description of a common structures and the like will be omitted by using the same reference numerals or letters.

Figure 7:
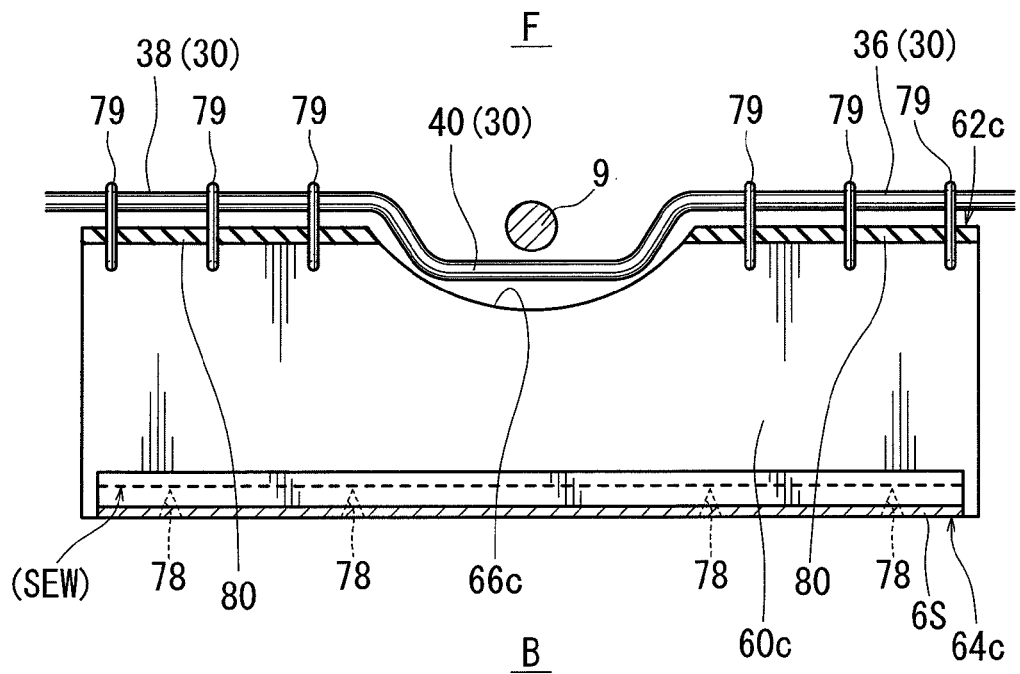
FIG. 7 is perspective view showing an upper front of a vehicle seat of the third embodiment.

Referring to FIG. 7, a strip member 60c (a rectangular shape in an upper front view) is a continuous strip member. One edge 64c is constituted substantially by a linear shape. Other edge 62c is formed with a notched portion 66c (a semicircular shape) which corresponds with the guiding recess portion 40. The other edge 62c (excluding the notched portion 66c) includes a resin portion 80.

Skin member 6S is seamed to the one edge 64c. Then the resin portion 80 of the other edge 62c is fastened to the wire member 30 by the ring 79, and thus the core member 61 from the previous embodiments is not used.

In this structure, fastening by the ring 79 can be carried out by a constitution of the strip member 60c and an operation of forming the seat-back shape can be simplified by omitting an operation of inserting the core member 61.

Alternative Embodiments

The cable wiring structure of the present invention is not limited to the previously described embodiments, and therefore it is possible to adopt various other modifications hereafter described.

(1) As described above, the guiding recess portion 40 can be bent in a direction reverse to the arm portion 34 (example of capable of holding the cable 9). When the guiding recess portion 40 can guide to pass the cable 9 (not interfering with the cable 9), the guiding recess portion 40 can be bent in any direction (typically, in an outer direction in a diameter direction of the wire member). The guiding recess portion 40 can be bent in a direction the same as that of the arm portion 34.

The guiding recess portion 40 is not limited to the rectangular shape. It can be constituted by various shapes, such as a semicircular shape, a semielliptical shape, a polygonal shape, a triangular shape, or the like, so far as the cable 9 can be guided.

(2) As described above, the wire members 30 can be arranged on the both sides of the pipe frame 10. As an alternative embodiment, the wire members 30 can be arranged at the pair of side frames 12, 12 (another example of "frame constituting both sides of the seat-back").

The wire member 30 can form a single or a plurality of guiding recess portions in accordance with a number of pieces of wiring the cables 9. In this case, the wire member is formed with a plurality of attaching portions, and therefore, the strip member can be divided to a plurality thereof in correspondence with the number of the attaching portions.

The wire member 30 can orthogonally be arranged to the pipe frame 10 and can be arranged inclinedly to the pipe frame 10.

A plurality of the wire members 30 can be arranged at the pipe frame 10 or the side frame 12 in correspondence with various seat shapes.

(3) The strip member 60 (60b, 60c) is not limited to be made by a cloth but can be constituted by a material having an expanding and contracting property as in leather or rubber material. A strip member having a mesh of a net or the like can also be used.

As described above, the notched shape portion 66 (notched portions 66b, 66c) can be provided at the strip member 60 (an example of further avoiding interference with the cable). The strip member 60 can be constructed by a constitution of extending over the guiding recess portion 40 (but not being attached directly to the guiding recess portion 40). In other configurations, the strip member 60 does not include notch portion 60 (for example, the other edge 62 can be a linear shape). The shape of the notched portion can be an elliptical shape, a polygonal shape or the like.

(4) As described in the second embodiment, the one edge 64b can be a bent recess shape, otherwise, the one edge 64b can be constituted by a recess shape of a stepped shape or a triangular shape. The shape of the one edge 64b of second embodiment is applicable also to the strip member 60c of the third embodiment.

(5) As described in the third embodiment, the resin portion 80 can be provided to the strip member 60 of the first embodiment or the strip member 60b of the second Embodiment. Further, "resin" includes a thermoplastic resin, a thermosetting resin and an elastomer.

(6) As described above, the cable 9 can bent in the process of wiring. As an alternative embodiment, the moving system 20 and the pressure receiving plate 22 can be connected by a cable wired in a linear shape. The moving system and the pressure receiving plate are not limited to the constitutions described in the embodiments but can be constructed by other various constitutions.

This invention claims:

1. A cable wiring structure of a vehicle seat comprising:
    a headrest attached to a seat-back a skin member covering the seat-back,
    a cable extending in the seat-back,
    a wire member extending between sides of a frame, and
    a strip member attached to the wire member, wherein when the cable is pulled and the headrest is moved to a seat front side, the cable is moved to extend through a guiding recess portion formed in a portion of the wire member and a portion of the skin member is pulled into the seat-back as the portion of the skin member is extended by the strip member over the guiding recess portion.

2. The cable wiring structure of a vehicle seat according to claim 1, wherein the strip member is provided with a pulling portion so that the portion of the skin member is pulled in correspondence with the guiding recess portion by the pulling portion.

3. The cable wiring structure of a vehicle seat according to claim 2, wherein the strip member includes a first edge and a second edge, the second edge is opposite to the first edge and the second edge includes a resin member extending thereal-ong, wherein the skin member is connected to the first edge and the second edge is attached to the wire member by a ring member.

4. The cable wiring structure of a vehicle seat according to claim 1, wherein the strip member includes a first edge and a second edge, the second edge is opposite to the first edge and the second edge includes a resin member extending thereal-ong, wherein the skin member is connected to the first edge and the second edge is attached to the wire member by a ring member.

* * * * *